United States Patent [19]

Kintz et al.

[11] Patent Number: 4,741,865
[45] Date of Patent: May 3, 1988

[54] FLAMEPROOFING COMPOSITION

[75] Inventors: Donald P. Kintz, Westford, Mass.; Stephen N. Davis, Cleveland, N.C.

[73] Assignee: Nyacol Products, Inc., Ashland, Mass.

[21] Appl. No.: 860,739

[22] Filed: May 7, 1986

Related U.S. Application Data

[63] Continuation-in-part of Ser. No. 614,921, May 29, 1984, abandoned.

[51] Int. Cl.$^4$ .................. C09K 21/00; C08K 3/10; C07C 17/42
[52] U.S. Cl. .................. 252/609; 106/18.24; 106/18.25; 106/18.28; 106/18.35; 260/DIG. 24; 523/205; 523/333; 524/409; 524/411; 524/412; 524/464; 524/567; 524/569; 524/851; 525/239; 570/102
[58] Field of Search .............. 252/601, 607, 608–611; 106/18.11, 18.24, 18.25, 18.28, 18.26, 18.35; 423/87, 617; 570/102; 521/907; 523/200, 205, 333; 260/DIG. 24; 524/408, 409, 411, 412, 462, 464, 469–470, 567–569, 851; 525/213–215, 239

[56] References Cited

U.S. PATENT DOCUMENTS

| | | | |
|---|---|---|---|
| 3,860,523 | 1/1975 | Petrow et al. | 252/608 |
| 4,110,247 | 8/1978 | Gower et al. | 252/610 |
| 4,307,148 | 12/1981 | LeBlanc | 252/607 |
| 4,360,450 | 11/1982 | LeBlanc | 252/607 |
| 4,360,624 | 11/1982 | Huang et al. | 524/411 |
| 4,362,658 | 12/1982 | Contin | 252/609 |

OTHER PUBLICATIONS

Lyons, John, 1970, The Chemistry and Uses of Fire Retardants, Wiley-Interscience, New York, pp. 17–18, 21, and 79.

Primary Examiner—Stephen J. Lechert, Jr.
Assistant Examiner—Howard J. Locker
Attorney, Agent, or Firm—Ernest G. Posner; J. S. Stephen Bobb; Fred C. Philpitt

[57] ABSTRACT

Polymer systems can be rendered flame retardant by adding a source of halogen and particles of antimony pentoxide that have been dried from colloidal dispersions that have been treated with certain metal ions. The properties of the polymer are conserved when the colloidal dispersion is treated with ions of metals that have insoluble antimonates before drying to form a powder.

2 Claims, No Drawings

FLAMEPROOFING COMPOSITION

RELATED U.S. PATENTS

This application is a continuation-in-part of our U.S. patent application Ser. No. 614,921, filed May 29, 1984, (now abandoned).

This application is related to Re. U.S. Pat. Nos. 3,860,523 and Re. 31,214 issued on Jan. 14, 1975, and Apr. 19, 1983, respectively.

BACKGROUND OF THE INVENTION

This invention relates to flame retardants of the antimony oxide type. It particularly involves improved colloidal antimony pentoxides for use in polyvinyl chloride polymers or for use with aliphatic bromine compounds added to various polymers.

For many years, antimony oxide has been used in conjunction with organic chlorides, bromides and other halogen-containing materials as a coating for fabrics, textiles, plastics and the like for rendering the same flame retarding. Such compounds are described, for example, in "The Chemistry and Uses of Fire Retardants," by J. W. Lyons (Wiley—Interscience: New York, 1970), pp. 17, 18, 21 and 79. While the reasons for the resulting flame-retardant properties are not fully understood, one school of thought is that an antimony oxide halogen compound may be generated in situ, which interrupts oxidizing reactions and thus inhibits the flame. In any event, the prior art has principally involved antimony oxide in the form of $Sb_2O_3$ and in pigmentary particle size, generally of the order of ½ to 1 micron.

While these prior antimony oxide compounds have been widely used, they are subject to rather serious deficiencies and drawbacks which have just had to be tolerated. It has been found that the pigmenting characteristics of tshe pigment-size particles often impair the color of the dyed fabric; or, when cast, as in films, plastics and resins, producing a milky, rather than a clear cast.

U.S. Pat. Nos. 3,860,523 and Re. 31,214 teach that antimony pentoxide in colloidal sol form remarkably overcomes every one of the above-described difficulties and, in addition, does so with greater efficiency, enabling the quantity of antimony required for a predetermined degree of flame-retarding to be substantially reduced below that required by pigment-grade particles. The colloidal particles of antimony oxide can be used as colloidal dispersions in water or dried to provide powders. Either of these forms can be readily formulated into various polymer systems combined with a source of halogen to provide effective fire retardancy. The lower refractive index of 1.7 together with the small size of the colloid (20 to 1000 angstroms) compared with the large size of the powder (10-40 microns) result in low pigmenting characteristics.

U.S. Pat. Nos. 3,860,523 and Re. 31214 (3,960,989) disclose that colloidal $Sb_2O_5$ can be prepared by dissolving potassium antimonate with some excess of KOH to form a solution that contains about 2% by weight of $Sb_2O_3$. This solution is passed through a cation exchange resin in the hydrogen form to yield insoluble $Sb_2O_5$ which may also be called antimonic acid. The particles of $Sb_2O_5$ being of colloidal size remain dispersed. As the concentration of $Sb_2O_5$ is increased, some particle growth and agglomeration takes place but the colloidal dispersion is still stable. The pH of this material is low, about 1.5, but can be varied without adversely affecting the colloid.

U.S. Pat. No. 4,110,247 teaches that a colloidal dispersion of $Sb_2O_5$ can be made from sodium antimonate. A slurry of the very slightly soluble sodium antimonate is circulated through a bed of cation exchange resin. As the small proportion of sodium ion solution is exchanged for hydrogen, more of the antimonate can go into solution. Finally most of the antimonate has been solubilized and the sodium exchanged, forming a colloidal dispersion of the antimony pentoxide. At this point the pH is about 1.7 and the product is similar to that described in the previously discussed patents.

U.S. Pat. No. 4,307,148 teaches that fibrous materials that contain cotton or are cotton substitutes can be treated with an alkali metal polyantimonate solution of a pH of about 8 absent any halogen to provide fire retardant properties. The alkali metal can be sodium or potassium.

None of these patents address an essential problem that has prevented the use of colloidal antimony pentoxide as a fire retardant in some formulated polymers. The colloidal $Sb_2O_5$, when dried from the colloidal dispersions, forms a powder wherein the particles are of colloidal dimensions. When these powders are included in polymers that are thermoplastic, thermoset or otherwise exposed to heat, the polymer is degraded. It is an object of this invention to provide colloidal $Sb_2O_5$ powders that can be formulated into polymers without degradation on exposure to heat.

SUMMARY OF THE INVENTION

Colloidal antimony pentoxide ($Sb_2O_5$) powders dried from sols treated with certain metal ions cause minimal changes in physical properties when they are formulated into some polymer systems. The $Sb_2O_5$ sols are treated with solutions containing ions of metals that have essentially insoluble antimonate. The improved colloidal $Sb_2O_5$ powder of our invention provides good fire retardant action while providing heat stability to resins that are degraded when untreated $Sb_2O_5$ is used and the resin is exposed to heat. Thermoplastic and thermoset resins benefit from use of our powder. Plastisols of polyvinyl chloride (PVC) dispersed in plasticizers are particularly benefited by use of the improved $Sb_2O_5$ powder.

THE INVENTION

The starting antimony pentoxide sol can be made by any suitable method such as colloid milling, chemical peptization or formation of colloidal sized particles in a plasma with subsequent dispersion of the particles in a suitable continuous phase. Particularly desirable colloidal antimony oxide dispersions can be prepared by the ion exchange method described in U.S. Pat. Nos. 3,860,523; Re. 31214 and 4,110,247. These patents are incorporated herein by reference. The sols produced by this method contain particulate $Sb_2O_5$ of colloidal size, about 2 to about 100 nm, the continuous phase of the colloidal dispersion being water and the pH being below about 4. Similar sols of $Sb_2O_3$ can also be used. Useful sols contain about 5 to about 50% antimony oxide.

For many fire retardant applications these sols are dried to powders prior to use. It has been found that some polymer systems containing colloidal $Sb_2O_5$ powder, when cured by heating or otherwise exposed to elevated temperatures, are degraded. Such degradation is evidenced by discoloration. We have found that such heat degradation can be alleviated by changing the surface of the $Sb_2O_5$ particles. The change is that the hydronium ions present on the surface are replaced with certain metal ions prior to spray drying. The required metals have essentially insoluble antimonates. Sodium, barium and calcium antimonates are insoluble, and solutions containing these metal ions are suitable for treating the sol before drying. The sol is treated by adding a solution containing said metal ions—the hydroxides are preferred to the $Sb_2O_5$ sol. Sufficient of the metal ion should be used to provide the desired heat stabilization of the organic polymers. The pH provides a convenient means of judging the amount of metal ion substitution on the surface. A final pH of about 6.5 to 11 prior to drying indicates sufficient metal substitution for many polymer systems. If the powder is to be used in a PVC plastisol, sufficient metal hydroxide (NaOH preferred) to provide a pH of 7.5 to 10 should be added to the $Sb_2O_5$ sol before drying. We prefer pH values of 8 to 9.

The metal treated sol can be dried in any convenient manner that does not promote excessive particle growth or excessive agglomeration. Fluid bed or spray drying methods are among preferred methods.

Our improved $Sb_2O_5$ powder is useful in polymer systems that degrade when unmodified $Sb_2O_5$ powder is incorporated. Such degradation is most apparent when heat is applied to the system. Thermoplastic and thermoset resins are benefited from use of our improved material since heat is applied or develops during preparation, cure and/or fabrication.

Our invention is especially useful in polymer systems that involve solutions, dispersions, emulsions or suspensions of the polymer resin in a suitable continuous liquid phase. Plastisols that are dispersions of resin particles in liquids, usually plasticizers, benefit greatly from use of our antimony oxide. Various vinyl polymers can be formulated into plastisols. A plastisol of polyvinyl chloride (PVC) is an excellent example of such materials, and the use of modified antimony oxide leads to improved heat stability when compared to use of plain antimony pentoxide. PVC formulated for extrusion or calendered coatings is also an excellent example, as is polypropylene containing ethane bisdibromo-norbornene dicarboximide.

Any compound that provides at least one labile halogen at increased temperatures can be utilized as the halogen donor required with the antimony oxide of our invention. Examples of useful materials include polyvinyl chloride, polyvinylidene chloride, mixtures of these materials, "Chlorowax," tetrabromobisphenol A bis (2,3 dibromo propyl ether), ethane bisdibromo-norbornene dicarboximide, hexabromocyclododecane, and the like.

We have tested metal ions or other basic ions as modifiers for $Sb_2O_5$ sol particles that do not have insoluble antimonates. Potassium and triethanolamine hydroxide solutions were used to change the surface of $Sb_2O_5$ prior to drying within the pH ranges recited hereinbefore. Neither material provided improved heat stability when incorporated into a PVC plastisol.

EXAMPLES

The following examples illustrate certain embodiments of our invention. These examples are not provided to establish the scope of the invention, which is described in the disclosure and recited in the claims. The proportions are in parts by weight (pbw) or percent by weight (% wt/wt) unless otherwise indicated.

The antimony pentoxide sol used in these examples was prepared as described in column 4, U.S. Pat. No. 3,860,523. The sol had the following composition and properties:

| | |
|---|---|
| $Sb_2O_5$ (%) | 17.0 |
| pH | 3.0 |
| Viscosity cps | 5.0 |

The plastisol composition used in these examples had the following composition:

| | pbw |
|---|---|
| Geon 121 pvc (polyvinyl chloride plastisol grade resin, B. F. Goodrich) | 100 |
| Santicizer 711 (phthalate plasticizer, Monsanto) | 50 |
| Paraplex G62 (epoxidized soybean oil, P. Hall) | 8 |
| Mark 7100 (barium, cadmium, zinc stabilizer, Argus) | 2 |
| Mark 517 (phosphite stabilizer, Argus) | 1 |

EXAMPLE 1

A portion of the $Sb_2O_5$ sol was agitated; then sufficient NaOH solution was added to produce a pH of 7.5. This material was dried in an oven (forced air conditions) at 110° C. for 18 hours to produce a solid material that contained 0.5% wt/wt moisture. This dried material was ground in a Waring blender to provide a powder with a small particle size. This material (3 pbw) was combined with sufficient of the plastisol described above to provide 100 pbw of the polyvinyl chloride resin. This combination was heated at 185° C. (365° F.) for 30 minutes. This plastisol did not darken as much as similar materials containing other antimony pentoxides. The plastisol is clear and transparent. Further, a greatly reduced level of pigment color can be used to achieve a dark shade of color compared with a plastisol containing antimony trioxide.

EXAMPLE 2

Three portions of the $Sb_2O_5$ were combined with sufficient NaOH solution to provide pH values of 7.2, 8.36 and 13.4. These materials were dried and ground as described in Example 1 and then combined with the plastisol composition also as described in Example 1. These combinations and a plastisol that contained no antimony oxide were heated at 190.5° C. (375° F.) for 30 minutes. The color of the control and the plastisol containing the $Sb_2O_5$ adjusted to 8.36 pH was the same. The plastisol with the 7.2 pH $Sb_2O_5$ was somewhat discolored, while the plastisol with the 13.4 pH material was somewhat more discolored.

EXAMPLE 3

A portion of the $Sb_2O_5$ sol was adjusted to a pH of 8.4 with NaOH solution as previously described. This material was spray dried under conditions that produced a free-flowing powder that contained 1.5% wt/wt moisture. This material was tested for heat stability as previously described at 193° C. (380° F.) for 15, 30, 45 and 60 minutes. The plastisol without any antimony oxide was also tested. There was no difference; the colors developed by these materials indicated that both have the same heat stability. Burn tests were carried out on cotton fabric coated with the plastisol of this example and a similar plastisol containing antimony trioxide. The results indicated that the pH adjusted $Sb_2O_5$ is a very effective flame retardant synergist.

Color samples containing 1% of a blue, red or green pigment paste had the same visual shade of color as samples containing antimony trioxide (3 phrs) and 4% of the same color pastes.

EXAMPLE 4

A powder was prepared as in Example 3 except that KOH was used instead of NaOH. It was found that the heat stability was poor as with a powder from a non-neutralized sol, that is, samples turned yellow to brown after 15 minutes at 193° C. Potassium antimonate is soluble, whereas sodium antimonate is insoluble in water.

We claim:

1. In the method of forming a flame retardant thermally color stable polyvinyl chloride polymer comprising the steps of:

(a) preparing a plastisol of polyvinyl chloride in a liquid plasticizer;
   (b) combining a colloidal $Sb_2O_5$ powder with said plastisol; and
   (c) heating said plastisol to induce fusion of the resin; the improvement comprising a modified $Sb_2O_5$ powder used in step (b) prepared by the steps of:
   (i) adjusting the pH of an aqueous colloidal dispersion of $Sb_2O_5$ to about 6.5 to 11 with NaOH, $Ba(OH)_2$ or $Ca(OH)_2$; and
   (ii) drying said adjusted dispersion to provide a powder.

2. In a flame retardant organic polymer system containing a source of halogen and colloidal $Sb_2O_5$ powder, said polymer system being degraded and its color altered upon heating, the improvement which provides color stability upon heating comprising that the colloidal $Sb_2O_5$ powder is modified being prepared by the steps of: (a) adjusting the pH of an aqueous colloidal dispersion of $Sb_2O_5$ to about 6.5 to 11 with NaOH, $Ba(OH)_2$ or $Ca(OH)_2$; and (b) drying said adjusted dispersion to provide a powder.

* * * * *